July 18, 1939.　　　C. C. HERSKIND　　　2,166,814
EXCITATION SYSTEM FOR THIRD HARMONIC INTERPHASE TRANSFORMERS
Filed July 1, 1938
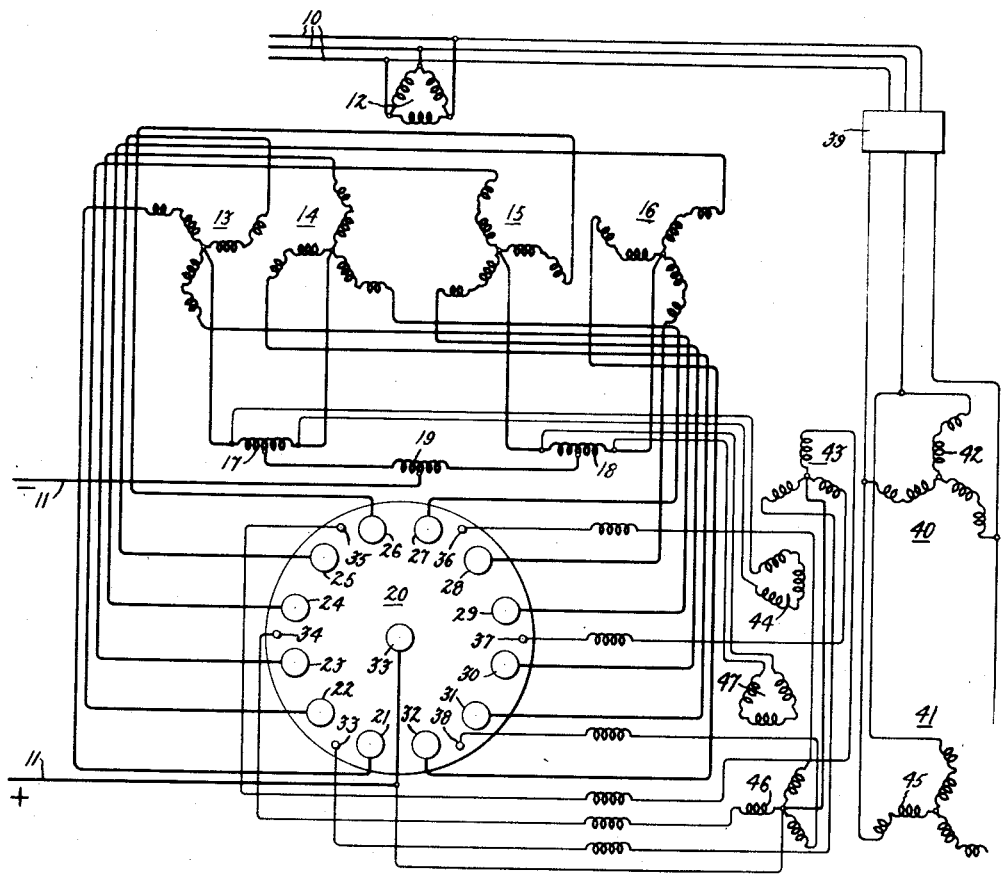
Inventor:
Carl C. Herskind,
by Harry E. Dunham
His Attorney.

Patented July 18, 1939

2,166,814

UNITED STATES PATENT OFFICE 2,166,814

EXCITATION SYSTEM FOR THIRD HARMONIC INTERPHASE TRANSFORMERS

Carl C. Herskind, Schenectady, N. Y., assignor to General Electric Company, a corporation of New York Application July 1, 1938, Serial No. 217,091

4 Claims. (Cl. 175—363)

My invention relates to electric valve converting systems and more particularly to such systems for supplying energy from an alternating current circuit to a direct current circuit.

In electric valve converting and rectifying systems it has been common to utilize a plurality of star-connected transformer networks the neutral points of which were interconnected by means of the inductive windings which also have been called interphase transformers. Such inductive windings in the instance of rectifying systems have a voltage which is a function of the load on the rectifier at light load, and which approaches substantially a constant value at heavy load. The voltage of such inductive windings is primarily that of the third harmonic and if some means were provided for supplying to said inductive windings this third harmonic magnetizing current at light load values on the rectifying system there would be obtained better regulation of the load characteristic of the electric valve rectifying system.

Heretofore there have been provided means for supplying excitation to such inductive windings or interphase transformers but they have had the disadvantage of requiring an additional winding or other auxiliary apparatus. These difficulties may be overcome particularly in the case where the rectifying system utilizes a single cathode multi-anode electric discharge valve of the type having a plurality of excitation anodes. In accordance with my invention I provide means for obtaining from the excitation anode transformers potentials suitable for supplying the necessary magnetization of the interphase transformers or inductors.

It is therefore an object of my invention to provide an improved electric valve converting system for transferring energy from an alternating current circuit to a direct current circuit.

Another object of my invention is to provide an improved electric valve rectifying system wherein the inductive windings or interphase transformers may be readily supplied with the necessary magnetization current.

For a better understanding of my invention, together with other and further objects thereof, reference is had to the following description taken in connection with the accompanying drawing in which the singe figure diagrammatically illustrates my invention as applied to a system for transmitting energy from a three-phase alternating current supply circuit to a direct current load circuit.

Referring more particularly to the drawing, there is shown a system for transmitting energy from a three-phase alternating current supply circuit 10 to a direct current circuit 11. This system includes a polyphase transformer network having a primary winding 12 and two pairs of star-connected secondary networks, 13, 14, 15, and 16. The neutral points of two of the star-connected networks 13 and 14 are interconnected by means of an inductive winding 17 and similarly the remaining two star-connected networks 15 and 16 are interconnected by another inductive winding 18. The midpoints of the inductive windings 17 and 18 are interconnected by a third inductive winding 19 the midpoint of which is connected to one side of the direct current circuit 11. The other extremities of the secondary polyphase networks 13 to 16 are interconnected with the direct current circuit by means of a multi-anode single cathode discharge device 20 having a plurality of anodes 21 to 32 and a single cathode 33. While my electric discharge device 20 may be of any of the types commonly known in the art, I have preferred to show for the purposes of explanation an electric discharge device of the type disclosed in United States Letters Patent No. 2,059,014 granted October 27, 1936, upon an application filed by Lysle W. Morton, and which is assigned to the same assignee as the present application. For the purposes of explanation it will be assumed that the various electrodes 21 to 32 are rendered conductive in the order enumerated and the conductivities of these anodes are facilitated by six excitation anodes 33 to 38 each associated with a different group of two of the main anodes 21 to 32 since each excitation anode is mounted between two of the main anodes.

In order that the excitation anodes 33 to 38 may be energized there is provided a control circuit energized from the alternating current source 10 through a suitable phase shifting device 39 which supplies energy to a pair of transformers 40 and 41. Each of these transformers are provided with a primary winding and secondary winding and a tertiary winding so that, for example, the transformer 40 is provided with a primary winding 42 which is connected in zigzag relation so as to provide at the terminals of the secondary winding 43 a voltage which is displaced in phase by thirty degrees from the alternating voltage supplied to the terminals of the primary winding 42. This transformer furthermore is provided with an open delta tertiary winding 44 the output of which is connected to supply third harmonic excitation energization to one of the inductive windings or interphase transformers 17 which interconnects the neutral points of the star-connected secondary windings 13 and 14. The transformer 41 is similarly provided with a zigzag terminal winding 45 so as to produce in the output secondary winding 46 voltages having a similar phase displacement with respect to the alternating potential supplied to the primary winding. This transformer is also provided with a tertiary winding 47 arranged in open delta relation and connected to energize the other inductive winding 18 which interconnects the neutral points of two of the star-connected secondary networks 15 and 16. The output voltages supplied by the tertiary windings 44 and 47 of the transformers 40 and 41 respectively, have a phase relation of 90 degrees.

It is believed that no further explanation of the operation of this device will be necessary to those skilled in the art since it is apparent that alternating current is supplied from the source 10 to the transformer network having a primary winding 12 and secondary star-connected networks 13 to 16 which are interconnected by suitable interphase transformers or inductors 17 to 19. The various anodes 21 to 32 and the corresponding excitation anodes 33 to 38 will be rendered conductive in proper sequence so that the electric valve converting means supplies direct current to the output circuit 11. The third harmonic excitation current supplied to the interphase transformers 17 and 18 will prevent abnormal voltage rises on the direct current circuit at low load values thereby improving the load voltage characteristic of the electric valve rectifying system.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination comprising a source of alternating current, a transformer energized therefrom and having $n$ pairs of star connected secondary networks, an inductive winding for each pair of said networks for interconnecting the neutral points thereof, a multi-anode single cathode electric discharge device interconnecting said polyphase secondary network windings with an output circuit, said electric discharge device being provided with a plurality of excitation anodes, $n$ transformers provided with primary, secondary and tertiary windings, said secondary windings providing potentials out of phase with respect to each other and with respect to said source of alternating current for energizing said excitation anodes, and means including said tertiary windings connected directly across said first-mentioned inductive windings interconnecting the neutral points of said pairs of secondary polyphase networks for supplying third harmonic current thereto, said tertiary windings each comprising an open delta winding.

2. The combination comprising a source of alternating current, two pairs of star connected polyphase networks energized from said source, an inductive winding for each of said pairs of networks for interconnecting the neutral points thereof, an electric discharge valve means connected to said star connected polyphase networks and being provided with a plurality of main anodes and a plurality of excitation anodes, a pair of transformers each provided with secondary windings for energizing said excitation anodes, each of said latter transformers being provided with an open delta tertiary winding, and means directly interconnecting said open delta tertiary windings with different ones of said inductive windings interconnecting the neutral points of said pairs of star-connected polyphase networks.

3. In an electric valve converting system, the combination comprising two pairs of star-connected polyphase networks each pair including an inductive winding interconnecting the neutrals thereof, an electric discharge valve means having a plurality of anodes connected to said star-connected polyphase networks, and a plurality of excitation anodes, a pair of polyphase transformers each having a star-connected secondary winding and an open delta tertiary winding, said secondary winding supplying voltages differing in phase with respect to each other and with respect to said source of alternating current, means connecting said secondary windings to said excitation anodes, and means directly connecting each of said open delta windings with a different one of said inductive windings interconnecting the neutral points of said first-mentioned polyphase star-connected networks.

4. The combination comprising a source of alternating current, a transformer energized therefrom and having $n$ pairs of star-connected secondary networks, $n$ inductive windings for interconnecting the neutral points of said pairs of secondary networks, an electric discharge valve means interconnecting said star-connected secondary networks with an output circuit, transformer means provided with $n$ open delta secondary windings for supplying potentials having phase differences of ninety degrees with respect to each other, and means for connecting each of said open delta windings directly across a different one of said inductive windings interconnecting the neutral points of said star-connected secondary networks.

CARL C. HERSKIND.